(12) United States Patent
Vainiomäki et al.

(10) Patent No.: US 6,529,732 B1
(45) Date of Patent: Mar. 4, 2003

(54) METHOD AND SERVICE PROVIDING MEANS FOR PROVIDING SERVICES IN A TELECOMMUNICATION NETWORK

(75) Inventors: Hannu Vainiomäki, Kirkkonummi (FI); Petri Maekiniemi, Wuerselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/460,712

(22) Filed: Dec. 14, 1999

(30) Foreign Application Priority Data

Dec. 16, 1998 (DE) .......................................... 98 123 524

(51) Int. Cl.[7] ................................................ H04Q 7/20
(52) U.S. Cl. ........................ 455/433; 455/552; 370/328
(58) Field of Search ................................ 370/310, 328, 370/337; 455/432, 433, 435, 552, 553

(56) References Cited

U.S. PATENT DOCUMENTS 5,950,123 A * 9/1999 Schwelb et al. ............ 340/7.57

FOREIGN PATENT DOCUMENTS

| EP | 0 817 513 A2 | 1/1998 |
|---|---|---|
| WO | 97/36447 | 10/1997 |
| WO | 98/00986 | 1/1998 |
| WO | 98/02011 | 1/1998 |
| WO | 98/53626 | 11/1998 |

OTHER PUBLICATIONS

Bech et al, "Camel: The Impact of Personal Communications on Intelligent Networks", XVI World Telecom Congress Proceedings, Sep. 21, 1997, pp. 225–233.

Yamaguchi et al, "Inter–System Mobility and Service Management in GSM/PDC Roaming", IEEE, 1997, pp. 694–698.

* cited by examiner

*Primary Examiner*—Nguyen T. Vo
(74) *Attorney, Agent, or Firm*—Nixon & Vanderhye, P.C.

(57) ABSTRACT

When a mobile station (MS) roams from a first telecommunication network (HPLMN) to a second telecommunication network (VPLMN) some of the features of the services to which the subscriber has subscribed to in the first telecommunication network (HPLMN) are differently implemented in the second network (VPLMN). According to the invention, the subscriber data and/or service data of services or of features of these services which are not supported in the second network (VPLMN) are converted by a conversion means (CM) of a service providing means (ASPM) into a format for a service which is supported in the second network (MSC/VLR'). Preferably, a dynamic updating and conversion can be performed such that the respective data is converted whenever it changes. Functionalities provided by a specific service supported differently in the second network will be provided by a service or a feature of a service which is available in the second network. Thus, the mobile subscriber can use at least some of the functions available to him in the first network also in the second network to which he has roamed. The data with the converted format can also be forwarded to a switching means (GMSC') of an interrogating network (IPLMN) or to a switching means (GMSC) of said first network (HPLMN) form which a terminating call is to be routed to said mobile station in said second network (VPLMN).

21 Claims, 7 Drawing Sheets

FIG.3

| FORMAT / SUBSCRIBER DATA | F1<br>CAMEL PHASE 2 FORMAT | F2<br>IN LIKE SERVICES FORMAT | F3<br>GSM E.164 FORMAT | F4<br>DECT FORMAT | ... | Fn<br>NMT FORMAT |
|---|---|---|---|---|---|---|
| (e.g. CALL FORWARDING) SD1 | (SHORT NUMBER) SD1-F1 | SD1-F2 | (LONG NUMBER) SD1-F3 | SD1-F4 | | |
| SD2 | SD2-F1 | SD2-F2 | SD2-F3 | SD2-F4 | | |
| | | | | | | |
| | | | | | | |
| SD m | | | | | | SDm-Fn |

CM

METHOD AND SERVICE PROVIDING MEANS FOR PROVIDING SERVICES IN A TELECOMMUNICATION NETWORK

FIELD OF THE INVENTION

The invention relates to a method and a service providing means for supporting services, to which a subscriber of a first telecommunication network has subscribed, in a second telecommunication network, when a mobile station roams from said first to said second telecommunication network. The invention also relates to a telecommunication network comprising such a service providing means.

In particular, the invention relates to a situation, where a subscriber has subscribed to specific services in the first telecommunication network and part of the services or a complete service is differently implemented in the second telecommunication network, when the mobile station roams to the second telecommunication network or when a call is to be routed to the second network.

BACKGROUND OF THE INVENTION

FIG. 5a shows a telecommunication system TELE, which comprises at least two different telecommunication networks HPLMN, VPLMN. Both networks HPLMN, VPLMN are, for example, mobile radio communication networks, for example according to a GSM specification, NMT (Nordic Mobile Telephony) specification, a TACS specification or a DECT specification. The first network HPLMN could, for example, be constituted by the D1 or D2 network in Germany and the second visiting network VPLMN could be the TELECOM network in Italy. In this case, the two networks HPLMN, VPLMN are geographically separated. However, it is also possible that a mobile station MS is provided with the option of using two different networks in one country. Hereinafter, the first network will be called the home network HPLMN and the second network will be called the visiting network VPLMN, independently as to whether the two networks geographically overlap or not.

FIG. 5a shows that each of the mobile radio communication networks comprises the usual functionalities of a home data base, formed by a home location register HLR, HLR', switching means, formed by a mobile switching center/visitor location register MSC/VLR, MSC/VLR', and gateway mobile switching centers GMSC, GMSC', which basically link the two networks. It should be noted that the units GMSC', HLR', SN' (a service node which will be explained below) are not used by a mobile station MS roaming from the home network HPLMN, but will be used of course by a mobile station MS which belongs to VPLMN (i.e. which regards VPLMN as home network). Furthermore, it is possible that the GMSC' is part of an IPLMN (interrogating PLMN) network in case of optimal routing which is indicated with the x-x-x line in FIG. 5a. Normal routing (used in today's networks) and optimal routing (contemplated for future use) will be explained below with reference to FIGS. 5b, 5c.

Different procedures are invoked when the mobile station MS (belonging to the home network HPLMN) roams from cell to cell in the home network HPLMN and when the mobile station MS roams to the visiting network VPLMN. When in the first case, as shown in the home network HPLMN, the mobile station MS just roams from cell to cell, e.g. from one MSC/VLR to another MSC/VLR in the same home network (indicated with the dotted arrow in HPLMN), a location updating procedure is performed with respect to the subscriber data stored in the home location register HLR, such that each MSC/VLR is always provided with the relevant subscriber data of the subscriber whose card has been inserted into the respective mobile station MS. In this case, a roaming detection means for detecting when said mobile station MS roams from one cell to another cell can be viewed as being constituted by parts of the base station system and parts of the mobile station. For example, during an on-going call a handover of the mobile station is carried out when the roaming detection means detects that the signal strength has decreased below an acceptable level such that another MSC/VLR should take over the communication. On the other hand, if the mobile station does not participate in call and is merely switched on, then at least the location updating procedure is carried out.

In the second case the mobile station MS roams to the visiting network VPLMN (indicated with the dashed arrows in FIG. 5a) in a state where it is switched on or in a case where it is only switched on after having entered the visiting network. In this case, the mobile station MS must register at the respective MSC/VLR' of the visiting network VPLMN which will request a copy of the relevant subscriber data to be sent from the home location register HLR of the home networks HPLMN, where the mobile station MS (more precisely the subscriber whose card is inserted into the mobile station) is registered.

A similar situation occurs when a call is to be routed to a mobile station MS which has roamed to a visiting network VPLMN. FIG. 5b shows the case of a normal routing and FIG. 5c shows the case of an optimal routing.

If e.g. in FIG. 5b a call is to be routed from MS1 to MS2 (a terminating call for MS2) then the GMSC will request HLR to provide routing information (step ST1). The HLR requests this information from MSC' (step ST2) which provides the information to HLR (step ST3). Then the information is forwarded to GMSC (step ST4) which can—on the basis of the received routing information—route the call to MS2 (step ST5). It should be noted that the call terminating scenario in FIG. 5b is in principle also valid if a call is originated from a terminal of a fixed network connected to the home HPLMN. Also in this case the call is first routed to the GMSC of the network HPLMN which then requests the routing information from MSC'.

Optimal routing as in FIG. 5c alway relates to terminating calls (IPLMN does not exist for originating calls). When the further network IPLMN (IPLMN: interrogating network for terminating calls) is provided, in case of optimal routing, the routing principle is exactly the same as in the case of normal routing, the difference being that the gateway MSC GMSC' resides in a different PLMN (i.e. IPLMN) That is, also in this case, terminating calls are always routed to the GMSC' which requests HLR for the routing information of MS2. HLR always knows where the MS2 is roaming and requests as in the case of FIG. 5b the respective MSC' in the visting network to provide e.g the roaming number (steps ST1–ST5; note that the x-x-x line in FIG. 5c corresponds to the x-x-x line in the general diagram in FIG. 5a). The difference between FIG. 5b, and FIG. 5c is that in FIG. 5c the terminating call is directly routed from the GMSC' to the MSC' in the visiting network (VPLMN) where the mobile station MS2 is registered.

If both networks only provide the normal GSM services to the mobile station MS and the subscriber has only subscribed to these normal services in the home network HPLMN, then no problem with the roaming to the visiting network VPLMN and the terminating of calls to the mobile station MS in VPLMN occurs in all cases in FIG. 5a, 5b, 5c, since the format of the subscriber data and/or service data which are stored in the home location register HLR in HPLMN and the format which the VPLMN can handle is the same. For example, a call forwarding number specified by the subscriber in the home network HPLMN will immediately be understood and can be processed also in the visiting network VPLMN, so that such types of information can immediately be copied and used in the MSC/VLR' of the visiting network VPLMN.

However, problems exist if some services, to which the subscriber has subscribed in the first network HPLMN, or an additional service are/is differently implemented in the visiting network VPLMN. For example, when the service is not supported in the visiting network VPLMN, of course any format of data relating to such services will not be understood can not be processed in the visiting network VPLMN. Indeed, such a situation can arise, since nowadays a subscriber in the home networks HPLMN has the option to subscribe to several new services provided in the home network HPLMN in addition to the services already provided by the network operator, e.g., the normal GSM services according to the GSM standards. On the other hand, a service (normally available with a subscription in the home network HPLMN) or an additional service to which the subscriber has subscribed to in the home network HPLMN may be as such available in the visiting network VPLMN, only that it is differently implemented, e.g. due to a different network standard. If in such a case the subscription data is forwarded from the MSC' in the visiting network VPLMN upon a request from the home network HPLMN, then it cannot be understood since it will e.g. have a different format not known in the home network HPLMN.

Additional services can be viewed as being provided by an additional service provision means ASPM, which may be constituted by a service node SN, SN' in the respective network. For example, the mobile subscriber may have a subscription to a CAMEL or IN (Intelligent Network) like service and in this case, the home location register HLR will contain some subscriber data and/or service data relating to such additional services. For example, the CAMEL services may be provided by a so-called CAMEL service environment CSE shown in FIG. 5a. According to GSM specifications, the CSE may be provided by the GSM/SSF (GSM Service Switching Function) and the GSM/SCF (GSM Service Control Function) nodes. More specifically and as shown in FIGS. 5b, 5c for home PLMN services the ASPM unit always resides in the home network HPLMN, i.e. the additional service provision is always done from the home network HPLMN, even when the mobile station roams to the visiting network. The SSF (which communicates with the ASPM; see step ST6 in FIGS. 5a, 5b) can reside in either the IPLMN or the VPLMN. In case of a realisation in terms of a Service Node SN or traditional IN (IN: Internet Network), it can also reside in the HPLMN as schematically indicated in FIG. 5a. In the special case of additional services being provided by a CAMEL environment as in FIGS. 5b, 5c, the SSF is integrated with the GMSC and/or the MSC' and/or the GMSC'.

Thus, there are various possibilities of where the service providing means ASMP can be located in the network HPLMN and VPLMN. Some special GSM services (functions) may be provided by functionalities always provided in a GSM type network according to the GSM specification. Nonetheless, the mobile subscriber will need a separate subscription to these special services.

However, independent as to where the ASPM and/or SSF and/or the SCF is located, there are always the above described problems that for various reasons a service which was fully available to the mobile station in its home network will not be available when it roams to the visiting network. If the mobile subscriber has, for example, a subscription to CAMEL or IN like services (as indicated in the subscriber data of HLR in FIG. 5a) in the home network HPLMN and is roaming in the visiting network VPLMN which cannot support this functionality, this mobile subscriber cannot use certain GSM mobile telephony services due to the interaction or mismatch problems. Also, when a mobile subscriber has subscribed to a CAMEL phase 2 service, which e.g. specifies a "forwarded-to-number" in a non-GSM (E.164) format, and is roaming in a network not supporting this CAMEL phase 2 service, he cannot use normal GSM call forwarding functionalities, although this is according to the GSM standards. The same problem occurs also when a user roams to a different network than a GSM network (e.g. from a GSM type network to a DECT/NMT/TACS type network as indicated in FIG. 5a). Thus, the problem of unavailability of service occurs in any situation where a mobile subscriber roams to a visiting network where a service is not supported, where a service is differently implemented, or where a service is implemented with different features.

For the case when a service which the mobile subscriber has available in the home network is differently implemented in the visiting network VPLMN, FIG. 6 shows in connection with FIG. 5a what happens when a mobile station MS (e.g., the mobile subscriber) roams to the visiting networks VPLMN in step S1. In any case, the mobile station MS must register at the MSC/VLR' (i.e. a roaming detection means formed by parts of the MSC/VLR' and the mobile station MS detects that there is a new mobile station MS in the visiting network VPLMN for which the visiting HLR' has no subscriber data). Essentially, the MSC/VLR' requests a copy of the subscriber data from the home HLR in step S2 and (possibly simultaneously) the visited MSC/VLR' indicates to the home HLR the services that are supported in the VPLMN. If the visited network VPLMN supports a special service, this means that the functionalities in all units of the visited network VPLMN can process subscriber data and/or service data relating to such a service. Although it may be noted that the service itself will still be provided to the mobile station from the home network HPLMN, even if it roams in the visited network VPLMN, the functionalities in the visited networks VPLMN must be adapted to process such service data which a visited network VPLMN only does if in principle it also supports these services through its own independent service node.

For the case of providing CAMEL type services, according to GSM standards, the home HLR should check in step S4, if the visited MSC/VLR' supports, e.g., CAMEL in case the mobile subscriber has a subscription CAMEL in the home network HPLMN. I.e., in step S4 the home HLR determines on the basis of the information indicated in step S3 which of the services to which the mobile subscriber has subscription in HPLMN are supported in the visited network VPLMN. If all services are provided ("Y" in step S4), then the HLR sends all subscriber data and/or service data contained in the HLR for the respective mobile subscriber to the visited MSC/VLR' in step S5. When some services are not provided ("N" in step S4), then the HLR sends to the visited MSC/VLR' all subscriber data and/or service data except the data relating to the non-supported services in step S6. For example, if CAMEL is not supported, HLR will not send CAMEL data to the visited MSC/VLR'. The same principle is applied for IN like services in GSM, NMT and TACS, i.e. whenever it is determined in the first network HPLMN that not all services are supported in the second network VPLMN, only part of the subscriber data and/or service data is copied into the visitor MSC/VLR'.

This causes a practical disadvantage, since, for example, a call forwarding number specified in a CAMEL service which the mobile subscriber indeed can use in the HPLMN, cannot be used when the mobile subscriber is in the visited network VPLMN, although in principle the visited network VPLMN has such call forwarding functionalities as well.

However, due to the format mismatch data cannot be used in the visited network.

SUMMARY OF THE INVENTION

As explained above, in a telecommunication system TELE there may arise situations where a mobile subscriber who has a subscription to a plurality of services in his own home networks HPLMN can only use part of the functions of the services in the visited network, since the services are either not supported there or the functions or functionalities of the service may in principle be available in the visited network VPLMN, are however differently implemented.

Therefore, the object of the invention is to provide a method, a service providing means and a telecommunication network which allow a mobile subscriber to use functions (features) or functionalities of one or more services to which he has a subscription in the home network also in the visting network, even if in the visiting network the functions (features) or functionalities are differently implemented, e.g. according to a different network standard, thus avoiding problems when attempting to use the functions (features) or functionalities of the service(s) available in the visiting network.

Solution of the Problem

This problem is solved by a method (claim 1) for supporting features of services, to which a subscriber of a first telecommunication network has subscribed, in a second telecommunication network, when a mobile station has roamed from said first to said second telecommunication network, comprising the following steps: determining in said first network whether features of one or more services to which said subscriber has subscribed to in said first network are supported or are supported differently in said second network, sending a conversion request message from a home database of said first network, in which the subscriber data and/or service data for each subscribed service is stored for each subscriber, to a service providing means, which provides the features of the subscribed services in said first network, said request message indicating subscriber data and/or service data relating to features of the subscribed services which have been determined as being supported differently in said second network, converting in said service providing means the format of said subscriber data and/or service data relating to features of services supported differently in said second network to a subscriber data and/or service data format of at least one service which is supported in said second network, and sending a response message containing said subscriber data and/or service data having said converted format back to said home data base.

Furthermore, this problem is solved by a service providing means (claim 7) for providing features of services, to which a subscriber of a first telecommunication network has subscribed, in said first network, including a conversion means for converting, in response to a conversion request message, which is issued from a home database of said first network, in which the subscriber data and/or service data of each subscribed service is stored for each subscriber, when a mobile station roams from said first to a second telecommunication network, and which indicates subscriber data and/or service data relating to features of subscribed services differently supported in said second network, the format of the subscriber data and/or service data relating to features of said differently supported services to a subscriber data and/or service data format of at least one service which is supported in said second network, and a response means for sending a response message containing said subscriber data and/or service data having said converted format back to said home data base.

Furthermore, this problem is also solved by a telecommunication network (claim 13) providing to a mobile station services to which a subscriber of said mobile station has subscribed to in said network, comprising: a home data base in which the subscriber data and/or service data of each subscribed service is stored for each subscriber of said network, a service providing means for providing said services in said network, a roaming detection means for detecting when said mobile station roams into another network in which at least one of said subscribed services is differently supported, said home database sending to said service providing means a conversion request message indicating subscriber data and/or service data relating to features of subscribed services which are differently supported in said another network when said roaming detection means detects said roaming of said mobile station, said service provision means comprising: a conversion means for converting in response to said request message the format of said indicated subscriber data and/or service data relating to features of the services supported differently in said another network to a subscriber data and/or service data format of at least one service which is supported in said another network, and a response means for sending a response message containing said subscriber data and/or service data having said converted format back to said home data base.

Essentially, according to the invention, a format conversion of the subscriber data and/or service data relating to functions (features) or functionalities of services which are supported differently in the visiting network is performed and the subscriber data and/or service data for functions (features) or functionalities of services which are supported together with the subscriber data and/or service data having the converted format are transferred to the visiting network. Since the conversion is always done into a format which can be understood and processed in the visited network VPLMN, the mobile subscriber can always use at least part of his originally subscribed services (functions) of the home network HPLMN also in the visited network VPLMN, even if the function (feature) is differently (i.e. with a different format) implemented in the visiting network.

Preferred Aspects of the Invention

If the visited network VPLMN supports the requested function (feature) or functionality of one or more services in several different implementations (formats), then the conversion means of the service providing means in the home networks HPLMN has the option to convert the format of the function in the home network into a selected one of the several formats used by services in the visited network VPLMN. That is, the conversion means can convert the format of the function data (subscriber data & service data) of functions of the services in the home network into a specific format of a service which supports these functions in the visiting network. Alternatively, the conversion means can convert the format of the functions (subscriber data & service data) also to respectively different formats of services in the visiting network which are best adapted to the function used in the home network HPLMN.

Preferably, a request message directed to the conversion means of the service providing means can contain an additional indication that further conversions should be performed whenever it is detected that a specific item of the subscriber data and/or service data has changed over time, which then causes a forwarding of the converted changed subscriber data and/or service data to the visiting network (the visited mobile switching center). For example, whenever a call forwarding number changes according to the time of day, a further conversion and sending of a message to the visited mobile switching center can be performed.

Further advantageous embodiments and improvements of the invention can be taken from the dependent claims. Hereinafter, the invention will be described with reference to its advantageous embodiments with reference to the attached drawings. In particular, it should be noted that the embodiments of the invention comprise combinations of features which have been separately described and listed in the claims and in the description. Hereinafter, a description of the invention follows with reference to what is currently considered to be the best mode of the invention.

BRIEF DESCRIPTION OF THE DRAWINGS

FIG. 3 shows a conversion table which can be used by the conversion means in FIG. 1 for carrying out the conversion according to the invention;

In the drawings, the same or similar reference numerals designate the same or similar parts and steps throughout. Hereinafter, the principle of the invention will be described with reference to FIG. 1 and FIG. 2.

DESCRIPTION OF THE INVENTION

Figure 1:
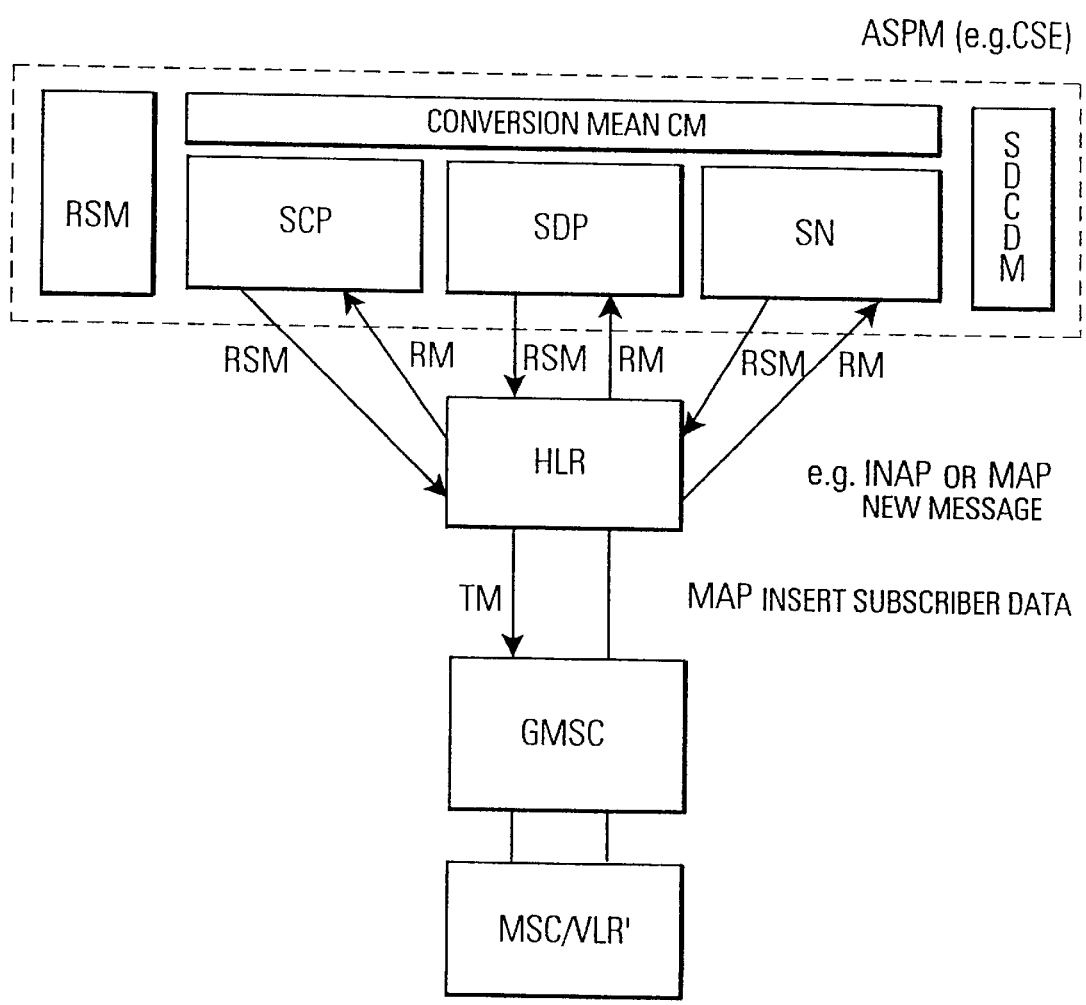
FIG. 1 shows an overview of the service providing means ASPM interacting with a home location register HLR of the home network HPLMN according to the invention.

In FIG. 1 the home location register HLR exchanges messages with a service providing means ASPM as was already generally described with reference to FIG. 5a. As explained, the service providing means ASPM may be provided separately by a service node, by a CSE environment or by individual units of the home network HPLMN (e.g. by GSMSSF or GSMSCF). Therefore, the service providing means ASPM is here generally considered for providing additional services to which a subscriber of a first telecommunication network HPLMN has subscribed to. In FIG. 1 the service providing means ASPM comprises, for example, a service node SN, a service control point SCP and a service data point SDP with which the home data base HLR can communicate.

In general, every service (independent as to whether it is an original GSM service or an additional service, for example provided by CAMEL) provides or comprises a plurality of functions (features) or functionalities, for example the GSM feature CallForwarding. The service and hence all its features (functions) and all its subscription data & service data will conform to a standard format defined for this service or function. For example, a certain CAMEL service call forwarding function may require the call forwarding number in a short number format. In the visiting network the same function (feature) as in the home network may be available, however it may be implemented with a different format. For example, in a GSM type forwarding function the call forwarding number has an E.164 (long) number format. Thus, despite the fact that in principle the functions or features of one or more subscribed services may be available in the visiting network, these functions or features cannot be used since they conform to a different standard or format. Thus, a roaming update of the MSC/VLR' with subscriber data & service data having such a format is of no use or may even cause an incorrect behaviour in the visiting network since it cannot be understood there due to the format mismatch.

Therefore, if a feature or a function of a service is "differently implemented" this means that the service as such is of course not supported, but that the particular function of a service, e.g. call forwarding, is implemented by a different service with a different format in the visiting network.

As shown in FIG. 1, according to the invention, the service providing means comprises a conversion means CM for performing a format conversion of subscriber data and/or service data relating to functions (features) or functionalities (subscribed to by the mobile subscriber in the home network) which are available in the visiting network which are, however, implemented there with a different format. The subscriber data and/or service data of the function desired to be converted by the conversion means CN are indicated in a conversion request message RM directed to the service providing means ASPM from the home database HLR. The conversion request message RM is issued by the HLR when the mobile station MS roams to the visited network VPLMN and if it is detected that some of the services or functions of services to which the mobile subscriber has subscribed to in the home network are not supported in the visited network VPLMN with the same format as in the home network. Of course the format conversion is only performed for functions or features which are supported in the visiting network (only with a different format) since if the function or feature is not supported at all in the visiting network the format conversion alone cannot help to support the function in the visiting network. Thus, if there are functions or features which do not have an equivalent in the visiting network, data of such functions or features should not be converted into any format since they will not have any meaning in any format in the visiting network. Such data should either not be transferred to the MSC/VLR' or should be converted to a format which cannot cause any incorrect behaviour in the VPLMN. Thus, the conversion request message RM is issued for all functions or features whose which are implemented with a different format in the visiting network or which may cause misinterpretation and thus a wrong behaviour.

Once the conversion to an available format in the VPLMN has been performed, a response message RSM is provided from a response means RSM to the HLR. The response message RSM contains the subscriber data and/or service data having the converted format. Furthermore, as part of the updating procedure for the switching means MSC/VLR', to which the mobile station MS has roamed (see FIG. 5a), a transfer message TM from the home location register HLR transfers the subscriber data and/or service data with format (s) (either data with the format in the HPLMN or data whose format was converted if there was a need for a data translation in order to avoid incorrect behaviour in the VPLMN) which are available in the visiting network VPLMN. The messages RM, RSM according to the invention can be transferred for example in an INAP or a MAP protocol. A MAP Insert Subscriber Data Message can be used for the transfer message TM. However, this is only an example of one transfer possibility and many other protocols like an internet protocol or similar protocols useful in the area of UMTS may be used for the transfer of the messages.

Furthermore, the service providing means ASPM in the home network HPLMN according to the invention comprises a service data change detection means SDCDM the function of which will be explained below with reference to the second embodiment.

Due to the exchange of the signaling messages RM, RSM in connection with the conversion means CM of the service providing means ASPM, there is now the possibility that the home networks HPLMN request information from, e.g., a CAMEL service environment CSE or in fact any IN node or service node SN which is vital for the normal mobile telephony service when CAMEL or IN like services cannot be used in VPLMN. Therefore, according to the invention, when HPLMN (HLR) allows the subscription, e.g., to both CAMEL or IN services and GSM services, the HPLMN (HLR) sends—based on the support of the visited VPLMN (MSC/VLR)—converted data, e.g., related to the GSM/NMT/TACS service or CAMEL or IN service (operator specific service) which is supported in the visited network VPLMN. In order to do this, HPLMN (HLR) requests the CSE, the IN or the service node to translate the CAMEL or IN service data to a specific format such that the data can be used in the visited networks not supporting the CAMEL or IN services in order to support, e.g., GSM/NMT/TACS services or to avoid any interactions. According to a preferred embodiment of the invention, the conversion procedure in the service node SN is configurable by the mobile subscriber or by the operator according to his service or subscriber profile. An example will be explained with reference to the second embodiment.

First Embodiment

Figure 2:
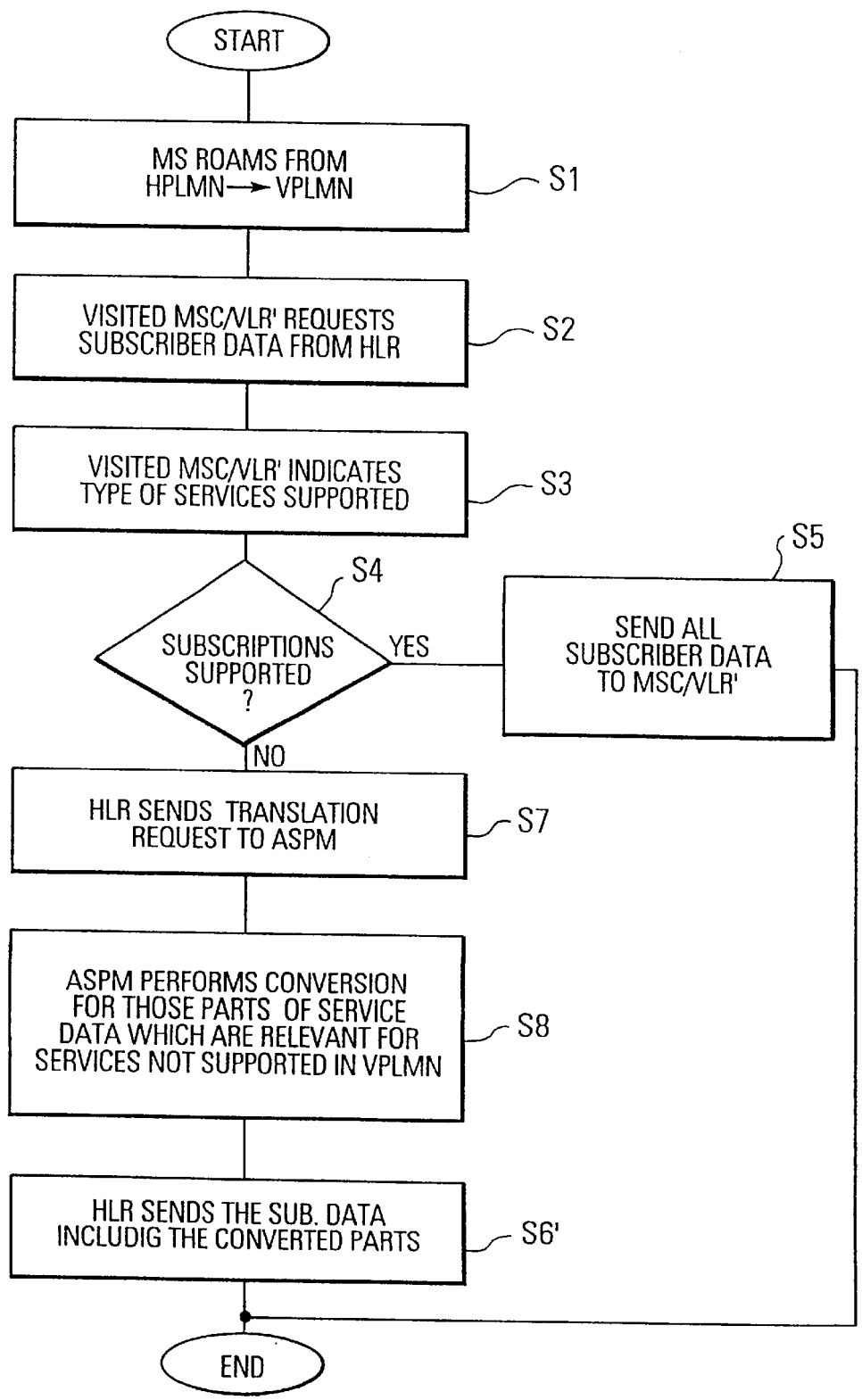
FIG. 2 shows the method according to the invention with reference to FIG. 1.
Figure 5A:
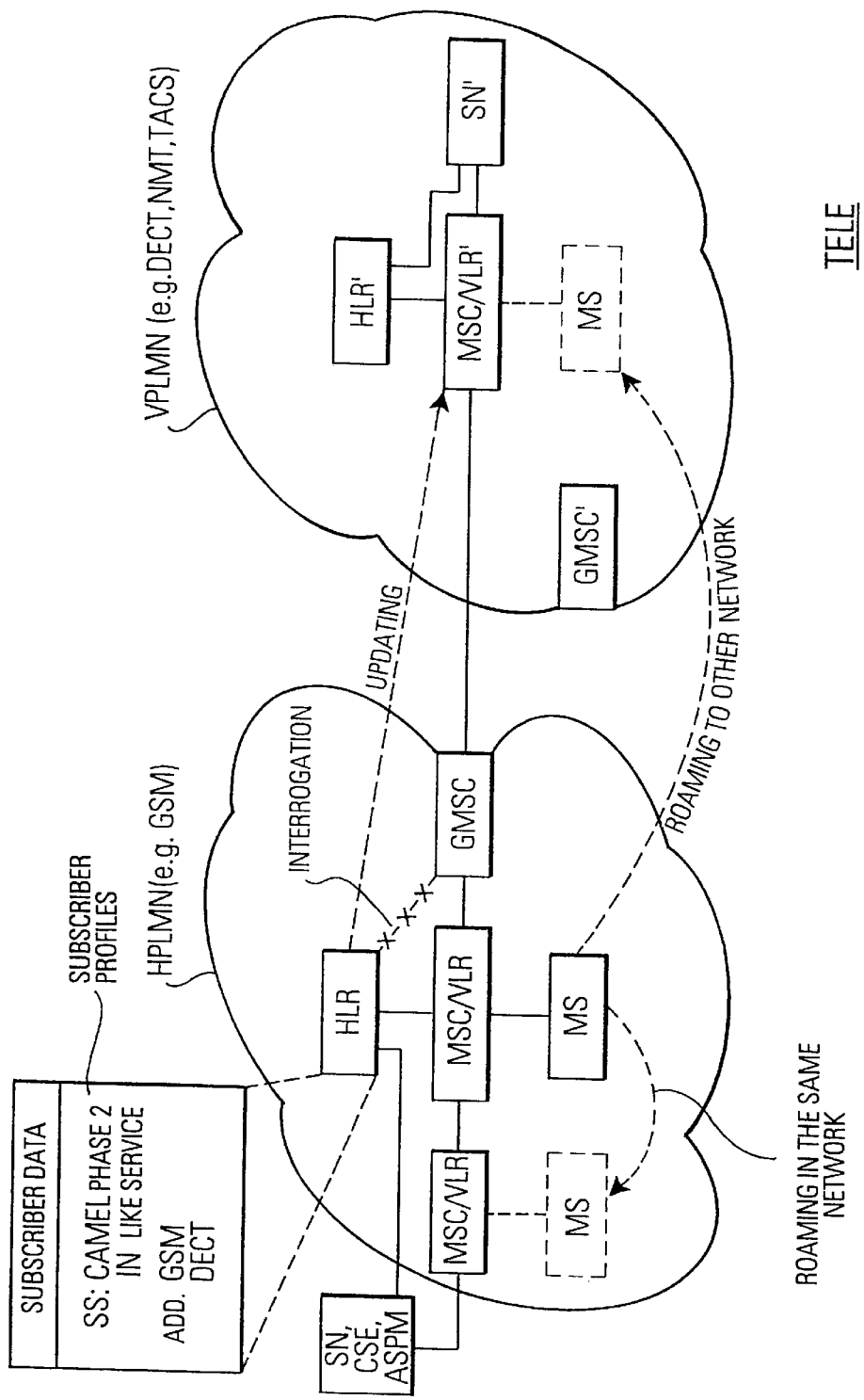
FIG. 5a shows an overview of a telecommunication system TELE according to the prior art, in particular showing the roaming of a mobile station MS from a home network HPLMN to a visited network VPLMN.

FIG. 2 shows in connection with FIG. 1 and FIG. 5a the method for supporting functions (features) or functionalities of services, to which a subscriber of a first telecommunication network HPLMN has subscribed, in a second telecommunication network VPLMN, when the mobile station MS roams from the first to the second network VPLMN and when there is need to perform a data format translation because at least some of the functions (features) of at least some services are differently implemented in the second network VPLMN.

Figure 6:
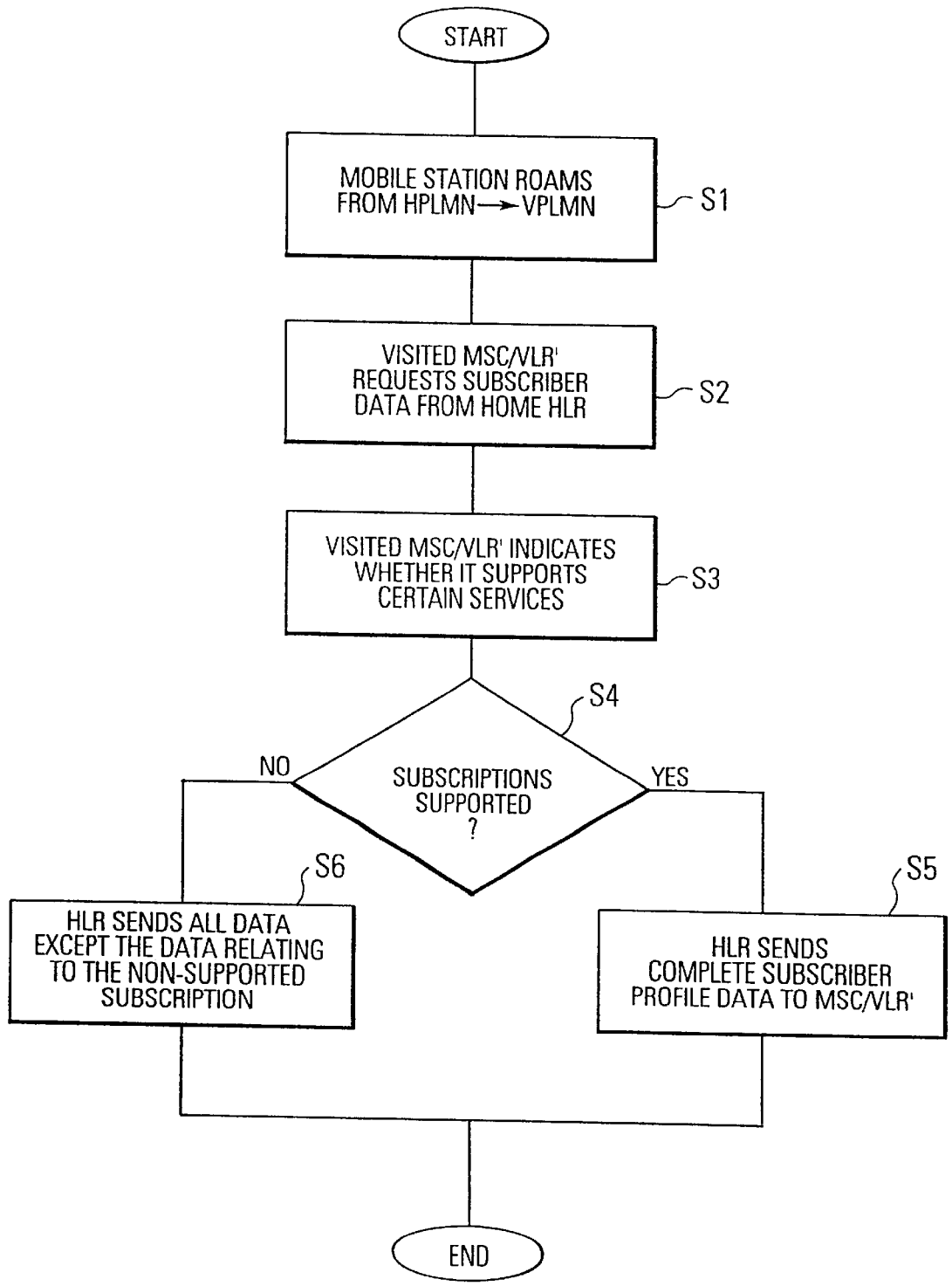
FIG. 6 shows a flowchart of the updating procedure according to the prior art.

Steps S1–S4 correspond to steps S1–S4 in FIG. 6. That is, when the mobile subscriber moves to the visited network VPLMN (more precisely it attempts to register at a visited MSC/VLR), or into a new network (e.g. DECT/NMT/TACS) the registering attempt or the roaming of the mobile station MS is detected. During the registration procedure, the home location register HLR of the home network HPLMN determines whether all services to which said subscriber has subscribed to in said first network HPLMN are actually also supported in said second network VPLMN. More specifically, the home network HPLMN determines whether there are functions or features of some services which the mobile subscriber has subscribed to in HPLMN and which are implemented with a different format in the VPLMN. As explained with reference to FIG. 6, this is normally done when the visited mobile switching center MSC/VLR' requests a copy of the subscriber data from the home location register HLR during which procedure it also indicates to the HLR which type of services, i.e. the functions or features of the services and their format, will be supported in the visited network VPLMN.

A similar situation occurs for the case of a terminating call to the mobile station MS2 as explained above with reference to FIGS. 5b, 5c. Before a terminating call can be routed to the MSC/VLR' where the mobile station resides in step ST5 there must be performed an updating of the HLR and GMSC (step ST4 in FIG. 5b) in HPLMN or the HLR and GMSC' (step ST4 in FIG. 5c) if the GMSC and GMSC' are respectively located in the HPLMN (in case of normal routing) or the interrogating IPLMN (in case of optimal routing).

Figure 5B:
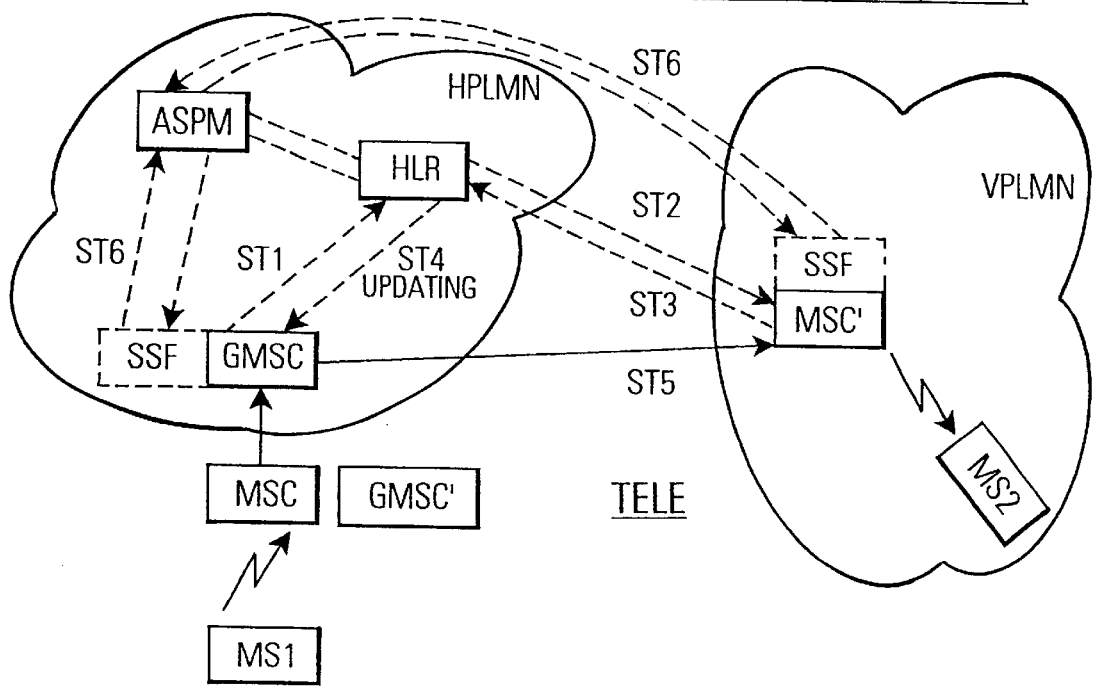
FIG. 5b shows an overview of the telecommunication system TELE of FIG. 5a for the case of normal routing where terminating calls from a first mobile station MS1 are routed from GMSC to a second mobile station MS2 which has roamed from HPLMN to VPLMN.

Hereinafter the updating and conversion procedure will be explained with reference to the case where the mobile station attempts to register at the MSC/VLR' and therefore initiates the conversion whilst it should be understood that the same principle also applies to the above mentioned cases when a conversion is requested as a result of attempting to route a terminating call to the mobile station from MS2 in HPLMN (or even from a fixed network in case of normal routing) or MS2 in IPLMN (in case of optimal routing), i.e. as a result of a routing information request message ST1 sent from said switching means GMSC' of the third interrogating network IPLMN (FIG. 5c) or from said switching means GMSC of the first network HPLMN (FIG. 5b). In these cases, as explained below with more detail, subscriber data and/or service data SD1-F1 ... SDm-Fn with said converted format is sent from said home data base HLR to said switching means GMSC' of said third network IPLMN or to said switching means GMSC of said first network HPLMN.

When HPLMN (HLR) notices during the registration procedure in the visited MSC/VLR' of the VPLMN (or during a terminating call to be routed from GMSC in HPLMN or GMSC' in IPLMN, i.e. as a result of a routing information request message ST1 sent from said switching means GMSC' of the third interrogating network IPLMN or from said switching means GMSC of the first network HPLMN) that the VPLMN (or the GMSC or GMSC' in the interrogating PLMN) does not support specific services such as e.g. CAMEL or IN services ("N" in step S4 in FIG. 2), which means that it supports functions or features of the service(s) with a different implementation or format, then the method proceeds to step S7 in FIG. 2. In step S7, the home data base HLR sends a conversion request message RM towards the CSE, IN or SN functionalities, i.e. generally to the service providing means. The request type can be viewed as "request for conversion of services".

The conversion request message RM sent to CSE, IN or SN depends on the subscriber profile, i.e. the request message contains information, i.e. indications of the subscriber data and/service data of functions or features of services which should undergo a conversion in the conversion means CM. If for example it is detected by HPLMN (HLR) during the registration that the CAMEL type implemented feature "call forwarding" of the CAMEL service in HPLMN is not supported in VPLMN but is implemented in a different format in VPLMN the request message must indicate that all service data and subscriber data relating to this function must undergo a format conversion.

Generally, subscriber data and/or service data (i.e. subscription data) which must be copied into the visited switching means MSC/VLR' (or used for updating in case of a terminating call routing) can be located in the HLR and/or in the service providing means ASPM. For example, for each subscribed service the HLR may contain as said subscriber data to be converted a subscriber identity and/or a network identification and/or a location of the subscriber in a format belonging to the specific service or to the function or feature of the service. On the other hand, the service data relating to a non-supported service, for example functions or features of a virtual private network VPN service, may be stored in the HLR or the ASPM. For example, when providing the service to the mobile subscriber, a special call forwarding number may be assigned and used by the service providing means ASPM, while this forwarding number will also be available in the HLR to be copied in the respective MSC/VLRs in the home network when the mobile station MS roams in the home network HPLMN from cell to cell during a location updating procedure.

Therefore, any kind of data, subscriber data and/service data that relates in any way to the functions or features of the service(s) implemented in a different format in the VPLMN will be transferred or at least indicated in the conversion request message directed to the HLR in step S7. If the specific data is only available in the service providing means, then the request message will only contain an indication as to what kind of data needs to be converted. For example, the conversion request message may contain the subscriber identity, the network identification, the location of the subscriber and service data related to CAMEL or IN service(S) to be converted to the corresponding service data supported by the visited networks VPLMN (e.g. switching means MSC/VLR). For example, CAMEL accepts call forwarding numbers in a short-number-format which must be translated to the usual GSM E.164 format which is always known in all GSM type networks and other networks.

FIG. 3 shows an embodiment of a format conversion table used by the conversion means CM in the conversion step S8 shown in FIG. 2. As shown in FIG. 3, the conversion means CM stores the data related to the services or the functions and features of the services in a plurality of formats. If ASPM provides services to several networks then a plurality of formats is needed, otherwise only one such translation is necessary. On the other hand, if the VPLMN implements the function or feature of the particular service with several different implementations or formats (such that it can e.g. understand the call forwarding number in several different formats) then it may be desirable to indicate in the request message to which of the plurality of formats the conversion is to be carried out.

Each of the individual rows may e.g. relate to a specific data item (of a particular function or feature) of one specific service. The first column for example shows a subscriber data SD1 relating to the feature "call forwarding number" of the call forwarding service. The conversion table stores this specific service data item in a plurality of different formats, i.e. in the short number format SD1-Fl for the CAMEL phase 2 VPN (virtual private network) service and in a long number format SD1-F3 for the GSM E.164 format. Possibly, the SD1 data item, i.e. the call forwarding number, is also stored in a plurality of other formats SD1-F2 (an IN like service format) and SD1-F4 (DECT/NMT/TACS format). Therefore, each row in the conversion table lists a specific data item relating to subscriber data and/or service data necessary for using specific functions or features of a service in the respective network and each column lists the format F1, F2 . . . Fn of the data item.

Per default the conversion means CM can always perform the conversion into a standard default format, e.g. the GSM format (if all networks HPLMN or VPLMN are GSM type networks), since invariably this format will be provided by all mobile radio communication networks into which a GSM type mobile station MS can roam. Preferably, the request message can also indicate a specific format into which all or specific parts of the subscriber data and/or service data should be converted. For example, during the registration procedure (or as explained above during the routing of the terminating call) the visited MSC/VLR' indicates to the HLR a plurality of functions or features of services which are indeed supported in the visited network VPLMN (and the format in which they are implemented in the VPLMN) in addition to the standard GSM functionalities. The ASPM must be capable of providing all this data, i.e. it must contains entries for all data items in all the formats which can be requested. In this case, the HLR can indicate in the request message RM to the conversion means CM into which type of service format the respective data relating to differently implemented functions or features of services is to be converted. The conversion means CM accesses the table in FIG. 3 with the specific subscriber data and/or service data item (either already present in the service providing means or transferred from the HLR in the request message) and reads out from the table the same type of data item in a different format, possibly the format indicated in the request message in case several possibilities are available in the visited network.

After the conversion means CM has in step S8 converted the received or requested data into the requested format which is supported for a particular feature or function of a service in the VPLMN, the converted data is then sent from the service providing means ASPM in a response message RSM back to the HLR in the home network HPLMN, e.g. with the following data subscriber identity, converted service data, network identity etc. in step S8.

In step S6' the converted subscriber data and/or service data SD1-F1 . . . SDn-Fn with the converted format (possibly together with data of the HLR which did not need a format conversion since it is supported for particular functions or features also in the VPLMN) is sent from the home location register HLR to the switching means of the second network to which the mobile station MS has roamed, i.e. where it requests a registration or to the GMSC or GMSC' in the IPLMN through which a terminating call is to be routed (FIGS. 5b, 5c) to the mobile station.

In FIG. 1 the service providing means ASPM is treated as a single unit for providing the services. However, of course it should be understood that the individual services may be provided separately by individual entities like the SCP, SDP, SN. If several different services are provided from different units, preferably, the HLR sends individual conversion request messages RM to the respective service providing nodes which then each return a response message with the data having a converted format. The SCF (service control function) can also collect this data, especially SCP as specified by the CS1 standard. Thus, the HLR or the SCF collects converted data items from all service providing entities. Each service providing entity may contain a conversion table in which the data relating to the services provided by the specific entity is also available in a number of different formats of services which are available in the visiting network VPLMN.

Figure 5C:
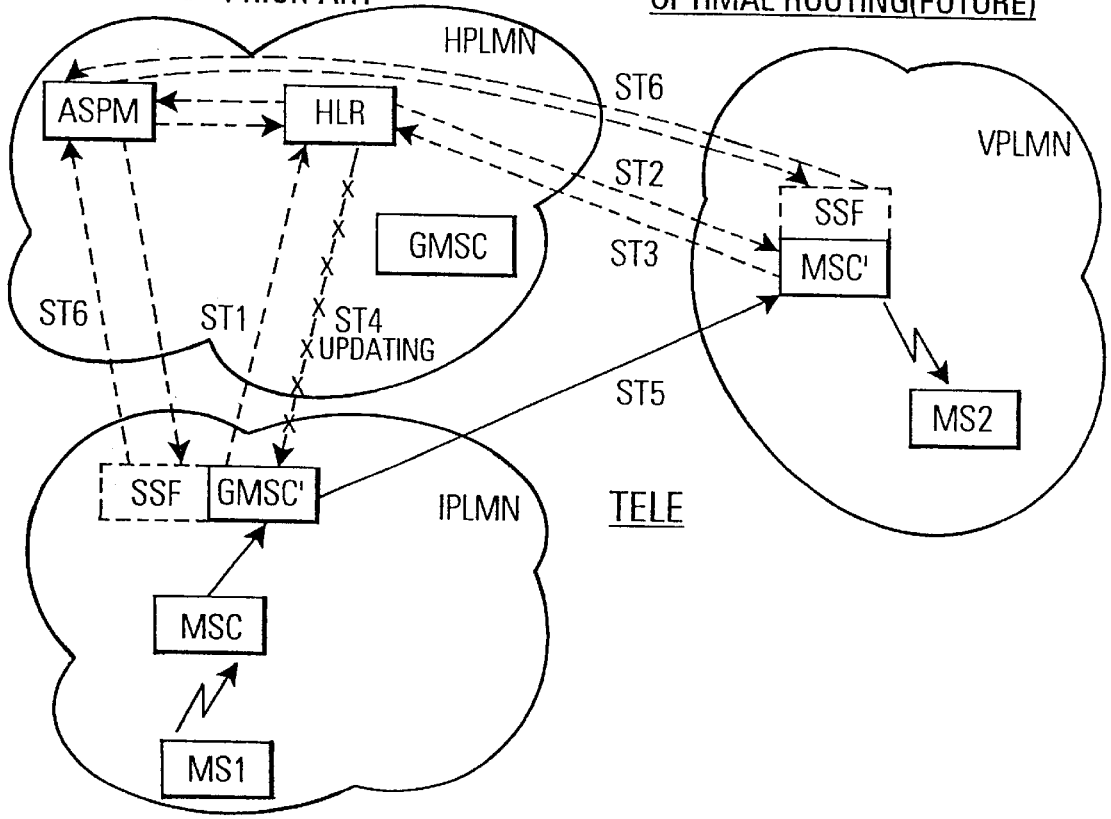
FIG. 5c shows an overview of the telecommunication system TELE of FIG. 5a for the case of optimal routing where terminating calls from a first mobile station MS1 situated in an interrogating network IPLMN are routed from GMSC' directly to a second mobile station MS2 which has roamed from HPLMN to VPLMN.

After the conversion the converted data received by the HLR is sent to the visited VPLMN (MSC/VLR'), or the GMSC (in case of normal routing; FIG. 5b) or the interrogating IPLMN (the GMSC' in case of optimal routing; FIG. 5c) as in the usual GSM procedure explained with reference to FIG. 6.

That is, in step S6' in FIG. 2 all the subscriber data and/or service data which did not have to be converted together with the possibly converted data is forwarded to the visited MSC/VLR'. The visited MSC/VLR' or the interrogating IPLMN (for example the gateway GMSC' in FIG. 5c) then invokes the function or features of the services in a way applicable to that node, i.e. since the copied subscription data now has a format that is available in the visited network, functionalities or function (features) carried out for the mobile station MS by a service available in the HPLMN but not available in the VPLMN (or implemented with a different format) are now carried out by a function or feature of a service which is indeed available in the VPLMN.

Second Embodiment

As explained above, the service providing means ASPM shown in FIG. 1 also comprises a service data change detection means SDCDM. This means SDCDM monitors the subscriber data and/or service data relating to services provided by the service providing means ASPM and detects whether over time any changes occur in these data. If a change of any kind of data into a new value is detected, e.g. when a call forwarding number changes dependent on the time of the day or by an administration means, then the new data item will again be converted into the suitable format of a service which is supported in the visited network. Preferably, the request message RM indicates changing service data to be converted in case it changes over time and a service data change detection instruction indicating to the conversion means CM that a conversion of the format of the changing service data is to be performed whenever said service data has changed in said first network. A message containing the changed service data having the converted format is sent to the switching means MSC/VLR' (or the GMSC or GMSC' in case of an interrogating network IPLMN for routing a terminating call to the mobile station in the VPLMN) of the visited network VPLMN whenever said service data has changed.

Figure 4:
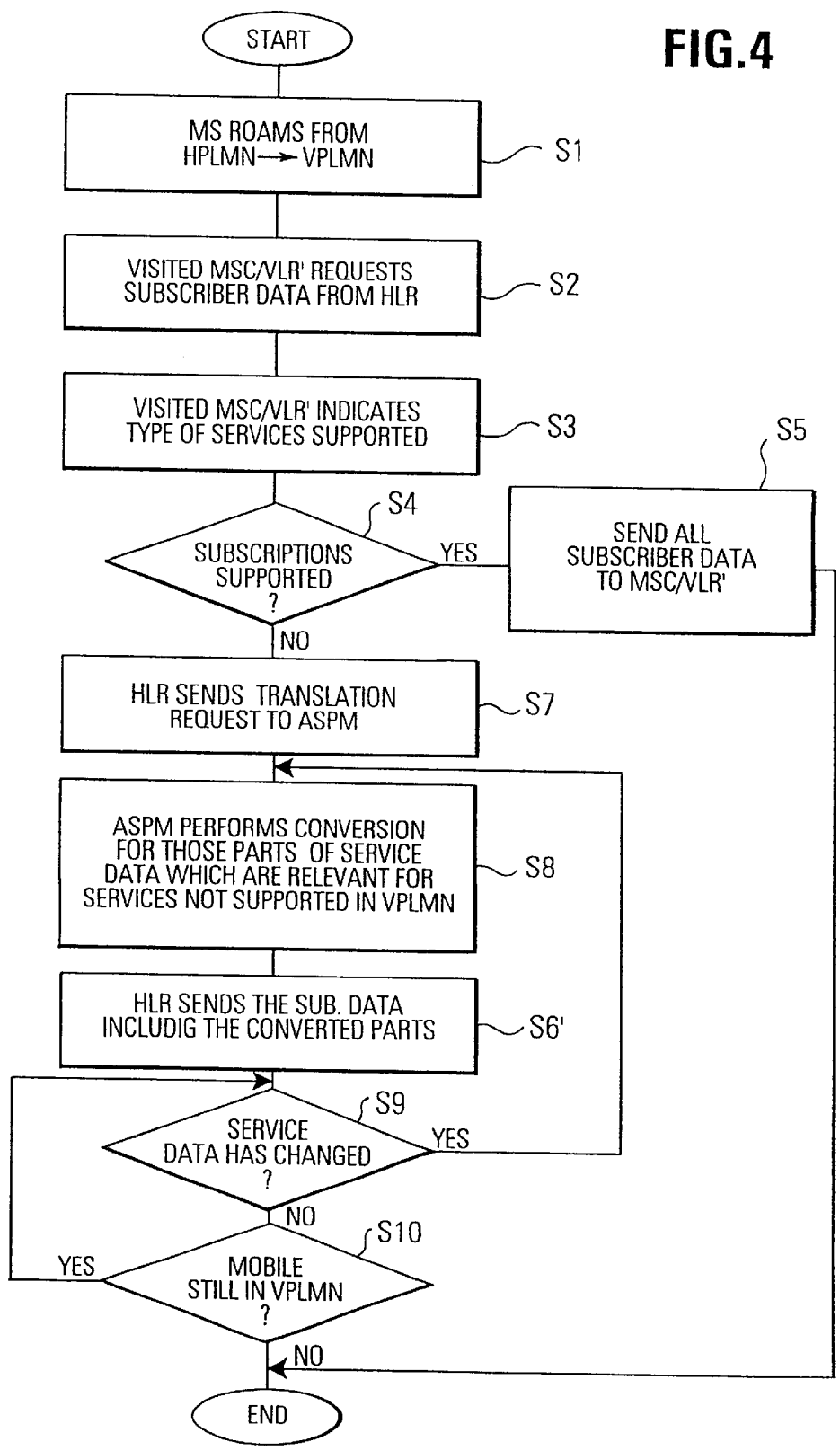
FIG. 4 shows a flowchart of the method according to the invention for a dynamic updating of changing subscriber data and/or service data.

That is, as shown in FIG. 4, if the first request message RM sent from the HLR to the service providing means ASPM during the registration contains the change monitoring instruction, step S9 monitors whether any kind of subscriber data and/or service data has changed. If so, "Y" in step S9, another conversion of specific data items indicated in the original request message is performed. The monitoring whether or not any kind of data changes is carried on ("N" in step S9 and "Y" in step S10) as long as the mobile station roams in this VPLMN.

Of course, it is not necessary to include the indications with respect to a monitoring of changing data items in the first request message. A second request message only indicating for example the subscriber identity and the services of interest to be monitored may be sent to the service providing means ASPM (or the respective individual service nodes) after the first request message. Thus, the HLR can also make a query with a type indicating "update in case service data is changed" towards all applicable service nodes, e.g. CSE, if the network is a GSM network. The new second request message includes the subscriber identity and the services of interest. When this request message is accepted by the service node, it can thus inform the HLR of the HPLMN (or the GMSC or GMSC' in an IPLMN) in case the requested service data is changed. This is very useful in cases where service data is not static but dynamic. For example, the call forwarding number as explained above can depend on the time of the day or is changed by an operator or a subscriber administration. Therefore, the service data change detection means SDCDM, i.e. a monitoring entity in the CSE, checks whether the translated data is still valid and sends an updating response message if something has changed. As explained, this monitoring can be invoked immediately with the first request message or with one or more subsequently sent request messages (also possibly sent separately to each individual service node).

INDUSTRIAL APPLICABILITY

As explained above, the above described method, service providing means and telecommunication network is applicable to all situations where a mobile station roams to a new network in which some of the services to which the mobile subscriber has subscribed to in his home network are available, however are implemented with a different format. The invention also relates to the case where a terminating call is to be routed to the MSC/VLR' in the VPLMN from a GMSC in the HPLMN or a GMSC' in an IPLNM (so-called normal routing or optimal routing).

The invention is not specifically restricted to a specific type of mobile radio communication network and can be applied to any type of mobile radio communication network. Thus, the invention is also applicable to situations where the telecommunication system TELE comprises an interconnection of the mobile stations or of a terminal of an additional fixed network.

The invention is not restricted to the above described embodiments and examples and further modifications and variations of the invention are derivable by a skilled person on the basis of the above teachings. In particular, the invention may comprise embodiments formed by combinations of features which have been separately described in the above specification and listed in the following claims.

In the appended claims, reference numerals only serve clarification purposes and do not limit the scope of protection.

What is claimed is:

1. A method for supporting features of services, to which a subscriber of a first telecommunication network (HPLMN) has subscribed, in a second telecommunication network (VPLMN), when a mobile station (MS) has roamed from said first to said second telecommunication network (VPLMN), comprising the following steps:

a) determining (S2–S4) in the first network (HPLMN) whether features of one or more services to which the subscriber has subscribed to in the first network (HPLMN) are supported or are supported differently in the second network (VPLMN);

b) sending (S7) a conversion request message (RM) from a home database (HLR) of the first network (HPLMN), in which the subscriber data and/or service data (SD1-F1 . . . SDn-Fn) for each subscribed service is stored for each subscriber, to a service providing means (ASPM), which provides the features of the subscribed services in the first network, said request message (RM) indicating subscriber data and/or service data (SD1-F1 . . . SDm-Fn) relating to features of the subscribed services which have been determined as being supported differently in the second network (VPLMN);

c) converting (S8) in said service providing means (ASPM) the format (F1–Fn) of said subscriber data and/or service data (SD1-F1 . . . SDm-Fn) relating to features of services supported differently in the second network (VPLMN) to a subscriber data and/or service data format (F1–Fn) of at least one service which is supported in said second network (VPLMN); and d) sending a response message (RSM; TM) containing said subscriber data and/or service data (SD1-F1 . . . SDm-Fn) having said converted format back to said home data base (HLR).

2. A method according to claim 1, wherein said determining step a) is performed when the mobile station (MS) roams from the first network (HPLMN) to the second network (VPLMN) and attempts to register at a switching means (MSC/VLR') of the second network (VPLMN), wherein after step d) said subscriber data and/or service data (SD1-F1 . . . SDm-Fn) with said converted format is sent from said home data base (HLR) to a switching means (MSC/VLR') of the second network (VPLMN) to which the mobile station (MS) has roamed.

3. A method according to claim 2, wherein said request message (RM) or a further request message comprises an indication of changing service data to be converted in case it changes over time and a service data change detection instruction indicating that a conversion of the format of the changing service data is to be performed whenever said service data has changed in the first network, wherein a message containing said changed service data having the converted format is sent to said respective switching means (MSC/VLR') whenever said service data has changed and has been converted.

4. A method according to claim 1, wherein said determining step a) is performed in response to a routing information request message (ST1) sent from a switching means (GMSC') of a third network (IPLMN) or from a switching means (GMSC) of the first network (HPLMN) which attempts to route a terminating call to the mobile station (MS) roamed into the second network (VPLMN), wherein after step d) said subscriber data and/or service data (SD1-F1 . . . SDm-Fn) with said converted format is sent from said home data base (HLR) to said switching means (GMSC') of said third network (IPLMN) or to said switching means (GMSC) of the first network (HPLMN).

5. A method according to claim 4, wherein said request message (RM) or a further request message comprises an indication of changing service data to be converted in case it changes over time and a service data change detection instruction indicating that a conversion of the format of the changing service data is to be performed whenever said service data has changed in the first network, wherein a message containing said changed service data having the converted format is sent to said respective switching means (MSC/VLR') whenever said service data has changed and has been converted.

6. A method according to claim 1, wherein said request message (RM) indicates as said subscriber data to be converted one or more selected from the group consisting of: a subscriber identity, a network identification, a location of the subscriber, said service data related to said supported service and said differently implemented services.

7. A method according to claim 1, wherein the first and/or second networks (HPLMN; VPLMN) are GSM/NMT/TACS/DECT type mobile communication networks and said services supported differently in the second network (VPLMN) are one or more selected from the group formed by: CAMEL type services (in particular CAMEL phase 2 services), IN (IntelligentNetwork) type services, NMT (NordicMobileTelephony) type services, TACS (TotalAccessCommunicationsSystem) type services, predetermined GSM type services and DECT (DigitalEnhancedCordlessTelecommunications) services.

8. A service providing means (ASPM) for providing features of services, to which a subscriber of a first telecommunication network (HPLMN) has subscribed, in the first network (HPLMN), comprising:

a) a conversion means (CM) for converting (S8), in response to a conversion request message (RM), which is issued from a home database (HLR) of the first network (HPLMN), in which the subscriber data and/or service data (SD1-F1 . . . SDm-Fn) of each subscribed service is stored for each subscriber, when a mobile station (MS) roams from the first to a second telecommunication network (VPLMN), and which indicates subscriber data and/or service data (SD1-F1 . . . SDm-Fn) relating to features of subscribed services differently supported in said second network (VPLMN), the format (F1–Fn) of the subscriber data and/or service data (SD1-F1 . . . SDm-Fn) relating to features of said differently supported services to a subscriber data and/or service data format (F1–Fn) of at least one service which is supported in said second network (VPLMN); and b) a response means (RSM) for sending a response message (RSM; TM) containing said subscriber data and/or service data (SD1-F1 . . . SDm-Fn) having said converted format back to said home data base (HLR).

9. A service providing means according to claim 8, wherein said home database (HLR) sends said subscriber data and/or service data (SD1-F1 . . . SDm-Fn) with said converted format to a switching means (MSC/VLR') of said second network (VPLMN) to which said mobile station (MS) has roamed.

10. A service providing means according to claim 9, wherein said request message (RM) or a further request message comprises an indication of changing service data to be converted in case it changes over time and a service data change detection instruction indicating that a conversion of the format of the changing service data is to be performed whenever said service data has changed in the first network, wherein said conversion means (CM) performs a conversion and said response means (RSM) sends a response message containing said changed service data having the converted format to said switching means (MSC/VLR') whenever a service data change detection means of said conversion means (CM) detects that said service data has changed.

11. A service providing means according to claim 8, wherein said conversion means (CM) is adapted for performing said conversion in response to a routing information request message (ST1) sent from a switching means (GMSC') of a third network (IPLMN) or from a switching means (GMSC) of said first network (HPLMN) which attempts to route a terminating call to said mobile station (MS) roamed into said second network (VPLMN), and said home database (HLR) sends said subscriber data and/or service data (SD1-F1 . . . SDm-Fn) with said converted format to said switching means (GMSC') of said third network (IPLMN) or to said switching means (GMSC) of said first network (HPLMN).

12. A service providing means according to claim 11, wherein said request message (RM) or a further request message comprises an indication of changing service data to be converted in case it changes over time and a service data change detection instruction indicating that a conversion of the format of the changing service data is to be performed whenever said service data has changed in the first network, wherein a message containing said changed service data having the converted format is sent to said respective switching means (MSC/VLR') whenever said service data has changed and has been converted.

13. A service providing means according to claim 8, wherein said request message (RM) indicates as said subscriber data to be converted one or more selected from the group consisting of: a subscriber identity, a network identification, a location of the subscriber, said service data related to said supported service or differently supported services.

14. A service providing means according to claim 8, wherein the first and/or second networks (HPLMN; VPLMN) are GSM/NMT/TACS/DECT type mobile communication networks and said services supported differently in said second network (VPLMN) are one or more selected from the group consisting of CAMEL type services (in particular CAMEL phase 2 services), IN (IntelligentNetwork) type services, NMT (NordicMobileTelephony) type services, TACS (TotalAccessCommunicationssystem) type services, predetermined GSM type services and DECT (DigitalEnhancedCordlessTelecommunications) services.

15. A telecommunication network (PLMN) providing to a mobile station (MS) services to which a subscriber of said mobile station (MS) has subscribed to in the network (HPLMN), comprising:

a) a home data base (HLR) in which the subscriber data and/or service data (SD1-F1 . . . SDm-Fn) of each subscribed service is stored for each subscriber of the network (HPLMN);
b) a service providing means (ASPM, SN) for providing said services in the network (HPLMN);
c) a roaming detection means for detecting when the mobile station (MS) roams into another network (VPLMN) in which at least one of said subscribed services is differently supported;
d) said home database (HLR) sending to said service providing means (ASPM) a conversion request message (RM) indicating subscriber data and/or service data (SD1-F1 . . . SDm-Fn) relating to features of subscribed services which are differently supported in said another network (VPLMN) when said roaming detection means (RDM) detects said roaming of the mobile station (MS);
e) said service providing means (ASPM) including:
a conversion means (CM) for converting (S8) in response to said request message (RM), the format (F1–Fn) of said indicated subscriber data and/or service data (SD1-F1 . . . SDm-Fn) relating to features of the services supported differently in said another network (VPLMN) to a subscriber data and/or service data format (F1–Fn) of at least one service which is supported in said another network (VPLMN); and
a response means (RSM) for sending a response message (RSM; TM) containing said subscriber data and/or service data (SD1-F1 . . . SDm-Fn) having said converted format back to said home data base (HLR).

16. A network according to claim 15, wherein said home database (HLR) sends said subscriber data and/or service data (SD1-F1 . . . SDm-Fn) with said converted format to a switching means (MSC/VLR') of said second network (VPLMN) to which said mobile station (MS) has roamed.

17. A network (HPLMN) according to claim 16, wherein said request message (RM) or a further request message comprises an indication of changing service data to be converted in case it changes over time and a service data change detection instruction indicating that a conversion of the format of the changing service data is to be performed whenever said service data has changed in the first network, wherein said conversion means (CM) performs a conversion and said response means (RSM) sends a response message containing said changed service data having the converted format to said switching means (MSC/VLR') whenever a service data change detection means (SDCDM) of said conversion means (CM) detects that said service data has changed.

18. A network according to claim 15, wherein said conversion means (CM) is adapted for performing said conversion in response to a routing information request message (ST1) sent from a switching means (GMSC') of a third network (IPLMN) or from a switching means (GMSC) of said first network (HPLMN) which attempts to route a terminating call to the mobile station (MS) roamed into said second network (VPLMN), and said home database (HLR) sends said subscriber data and/or service data (SD1-F1 . . . SDm-Fn) with said converted format to said switching means (GMSC') of said third network (IPLMN) or to said switching means (GMSC) of the first network (HPLMN).

19. A network according to claim 18, wherein said request message (RM) or a further request message comprises an indication of changing service data to be converted in case it changes over time and a service data change detection instruction indicating that a conversion of the format of the changing service data is to be performed whenever said service data has changed in the first network, wherein a message containing said changed service data having the converted format is sent to said respective switching means (MSC/VLR') whenever said service data has changed and has been converted.

20. A network (HPLMN) according to claim 15, wherein said request message (RM) indicates as said subscriber data to be converted one or more selected from the group consisting of: a subscriber identity, a network identification, a location of the subscriber and said service data related to said differently implemented services.

21. A network (HPLMN) according to claim 15, wherein said first and/or second networks (HPLMN; VPLMN) are GSM/NMT/TACS/DECT type mobile communication networks and said services supported differently in said second network (VPLMN) are one or more selected from the group consisting of: CAMEL type services (in particular CAMEL phase 2 services), IN (IntelligentNetwork) type services, NMT (NordicMobileTelephony) type services, TACS (TotalAccessCommunicationsSystem) type services, predetermined GSM type services and DECT (DigitalEnhancedCordlessTelecommunications) services.

* * * * *